United States Patent
Prouvost et al.

(10) Patent No.: US 10,723,514 B2
(45) Date of Patent: Jul. 28, 2020

(54) POLYESTER-BASED COATING COMPOSITION FOR METAL SUBSTRATES

(71) Applicant: The Sherwin-Williams Company, Cleveland, OH (US)

(72) Inventors: Benoit Prouvost, L'Abergement de Cuisery (FR); Paul Stenson, Avon, CT (US)

(73) Assignee: The Sherwin-Williams Company, Cleveland, OH (US)

(*) Notice: Subject to any disclaimer, the term of this patent is extended or adjusted under 35 U.S.C. 154(b) by 944 days.

(21) Appl. No.: 14/883,176

(22) Filed: Oct. 14, 2015

(65) Prior Publication Data

US 2016/0031601 A1 Feb. 4, 2016

Related U.S. Application Data

(63) Continuation of application No. 13/856,159, filed on Apr. 3, 2013, now Pat. No. 9,187,213, which is a continuation of application No. PCT/US2011/056376, filed on Oct. 14, 2011.

(60) Provisional application No. 61/393,584, filed on Oct. 15, 2010.

(51) Int. Cl.
| | |
|---|---|
| *B65D 25/14* | (2006.01) |
| *B65D 1/12* | (2006.01) |
| *C09D 167/02* | (2006.01) |
| *C08J 7/04* | (2020.01) |

(52) U.S. Cl.
CPC ............. *B65D 25/14* (2013.01); *B65D 1/12* (2013.01); *C08J 7/0427* (2020.01); *C09D 167/02* (2013.01); *C08J 2467/02* (2013.01); *Y10T 428/1355* (2015.01); *Y10T 428/31681* (2015.04)

(58) Field of Classification Search
CPC ........ B65D 1/12; B65D 25/14; C08J 2467/02; C08J 7/047; C09D 167/02; Y10T 428/1355; Y10T 428/31681
See application file for complete search history.

(56) References Cited

U.S. PATENT DOCUMENTS

| | | | |
|---|---|---|---|
| 3,954,899 A | 5/1976 | Chang et al. | |
| 4,012,363 A | 3/1977 | Bruning et al. | |
| 4,356,277 A | 10/1982 | Birkmeyer | |
| 4,864,000 A | 9/1989 | Boston et al. | |
| 5,252,669 A | 10/1993 | Maska et al. | |
| 5,288,559 A | 2/1994 | Oka et al. | |
| 5,290,828 A | 3/1994 | Craun et al. | |
| 5,380,816 A | 1/1995 | Sullivan | |
| 5,411,810 A | 5/1995 | Hirakouchi et al. | |
| 5,700,529 A | 12/1997 | Kobayashi et al. | |
| 5,739,215 A | 4/1998 | Westerhof et al. | |
| 5,942,285 A | 8/1999 | Schmid et al. | |
| 5,994,462 A | 11/1999 | Srinivasan et al. | |
| 6,200,683 B1 | 3/2001 | Montague et al. | |
| 6,235,102 B1* | 5/2001 | Parekh ............... | C09D 133/068 106/287.22 |
| 6,235,439 B1 | 5/2001 | Whiting | |
| 6,270,855 B1 | 8/2001 | Jung et al. | |
| 6,413,648 B1 | 7/2002 | Heyenk et al. | |
| 6,420,040 B1 | 7/2002 | Seibel et al. | |
| 6,458,439 B1 | 10/2002 | Jung et al. | |
| 6,461,688 B1 | 10/2002 | Seibel et al. | |
| 6,472,480 B1 | 10/2002 | Anderson | |
| 6,576,343 B2 | 6/2003 | Parekh et al. | |
| 6,670,429 B2 | 12/2003 | Appelman et al. | |
| 6,730,361 B2 | 5/2004 | Parekh et al. | |
| 6,893,678 B2 | 5/2005 | Hirose et al. | |
| 6,916,874 B2 | 7/2005 | Mazza et al. | |
| 7,198,849 B2 | 4/2007 | Stapperfenne et al. | |
| 7,381,472 B2 | 6/2008 | Brandenburger et al. | |
| 7,659,341 B2 | 2/2010 | Wamprecht et al. | |
| 7,763,323 B2 | 7/2010 | Mayr et al. | |
| 8,133,557 B2 | 3/2012 | O'Brien et al. | |
| 8,142,858 B2 | 3/2012 | Mayr et al. | |
| 8,231,951 B2 | 7/2012 | O'Brien et al. | |
| 8,481,645 B2 | 7/2013 | Payot et al. | |
| 8,765,241 B2 | 7/2014 | Parekh et al. | |
| 9,550,913 B2 | 1/2017 | Parekh et al. | |
| 2004/0044117 A1 | 3/2004 | Kiefer-Liptak et al. | |

(Continued)

FOREIGN PATENT DOCUMENTS

| | | |
|---|---|---|
| CN | 1871319 | 11/2006 |
| CN | 101037565 | 9/2007 |

(Continued)

OTHER PUBLICATIONS

International Search Report, Written Opinion and International Preliminary Report on Patentability for related case application No. PCT/US2011/056376 (12 pages).
Fakirov, et al., On the Relationship between Microhardness and Glass Transition Temperature of Some Amorphous Polymers, Journal of Polymer Science: Part B, vol. 37, pp. 1413-1419 (7 pages).
Extended search report for European Patent Application No. 2627723 dated Aug. 22, 2014.
ASTM Designation: D 3359-02, Standard Test Method for Measuring Adhesion by Tape Test, Oct. 2002 (8 pages).
ASTM Designation: D 5402-93, Standard Practice for Assessing the Solvent Resistance of Organic Coatings Using Solvent Rubs, Jul. 1993 (5 pages).

(Continued)

*Primary Examiner* — Yan Lan
(74) *Attorney, Agent, or Firm* — Honigman LLP

(57) ABSTRACT

The present invention provides novel packaging articles, e.g., food and beverage cans, having a novel coating composition applied to at least a portion of a surface thereon. In preferred embodiments, the coating composition includes at least a film-forming amount of a copolyester resin having a backbone that includes one or more soft segments and a plurality of hard segments. The copolyester resin preferably has a glass transition temperature from about from about 10° C. to about 50° C. The present invention also provides a method for making coated articles.

41 Claims, No Drawings

(56) References Cited

U.S. PATENT DOCUMENTS

| | | | |
|---|---|---|---|
| 2006/0093768 A1* | 5/2006 | Parekh | C08G 18/4202 428/35.8 |
| 2007/0036903 A1 | 2/2007 | Mayr et al. | |
| 2007/0054140 A1 | 3/2007 | Mayr et al. | |
| 2011/0244156 A1 | 10/2011 | Lock et al. | |
| 2011/0244157 A1 | 10/2011 | Singer et al. | |
| 2012/0051540 A1 | 3/2012 | Moon et al. | |
| 2012/0318699 A1 | 12/2012 | Parekh et al. | |
| 2017/0321082 A1 | 11/2017 | Parekh et al. | |

FOREIGN PATENT DOCUMENTS

| | | |
|---|---|---|
| DE | 4010167 C2 | 10/1991 |
| DE | 19912794 | 9/2000 |
| EP | 0964038 A2 | 12/1999 |
| EP | 1273626 | 1/2003 |
| EP | 1277814 A | 1/2003 |
| JP | 07278487 A | 10/1995 |
| JP | 08081652 A | 3/1996 |
| JP | 2000290585 A | 10/2000 |
| JP | 2001019876 A | 1/2001 |
| JP | 2001172561 A | 6/2001 |
| JP | 2003301137 | 10/2003 |
| JP | 2006257317 | 9/2006 |
| JP | 2007246603 | 9/2007 |
| KR | 20070001160 | 1/2007 |
| WO | 987974 | 10/1998 |
| WO | 0055265 A1 | 9/2000 |
| WO | 0055267 | 9/2000 |
| WO | 01/45866 | 6/2001 |
| WO | 2005080517 | 9/2005 |
| WO | 2009156457 A1 | 12/2009 |

OTHER PUBLICATIONS

Machine translation of previously-cited reference, Japanese patent appl. No. 2001-172561, dated Jun. 26, 2001 (9 pages).

Human translation of Japanese patent appl. No. 2001-172561, dated Jun. 26, 2001 (9 pages).

"Paints and coating technology", Xuemin Zhang et. al, p. 26-27, Chemical Industry Press, Jan. 2006.

* cited by examiner

POLYESTER-BASED COATING COMPOSITION FOR METAL SUBSTRATES

CROSS-REFERENCE TO RELATED APPLICATIONS

This application is a continuation of pending U.S. application Ser. No. 13/856,159 (now U.S. Pat. No. 9,187,213), filed on Apr. 3, 2013, which is a continuation of International Application No. PCT/US2011/056376, filed Oct. 14, 2011, which claims priority to U.S. Provisional Application Ser. No. 61/393,584 filed by Prouvost et al. on Oct. 15, 2010 and entitled "Polyester-Based Coating Composition for Metal Substrates," each of which is incorporated by reference herein in its entirety.

BACKGROUND

A wide variety of coatings have been used to coat the surfaces of two-piece food and beverage cans. These cans are generally coated using "coil coating" operations, i.e., a planar sheet of a suitable metal substrate (e.g., steel or aluminum metal) is coated with a suitable composition and cured and then the coated substrate is formed into the can end or body. The coating should be capable of high-speed application to the substrate and provide the necessary properties when cured to perform in this demanding end use. For example, the coating should be safe for food contact; have excellent adhesion to the substrate; be capable of being drawn during the forming step; when used as an end coating, provide clean edges when the end is opened; resist staining and other coating defects such as "popping," "blushing" and/or "blistering;" and resist degradation over long periods of time, even when exposed to harsh environments. Previous coatings have suffered from one or more deficiencies.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds commonly used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Polyester-based coatings suitable for food-contact that have exhibited both good fabrication properties and an absence of crazing having tended to be too soft and exhibit unsuitable corrosion resistance. Conversely, polyester-based coatings suitable for food contact that have exhibited good corrosion resistance have typically exhibited poor flexibility and unsuitable crazing when fabricated.

What is needed in the marketplace is an improved binder system for use in coatings such as, for example, packaging coatings. Such packages, compositions and methods for preparing the same are disclosed and claimed herein.

SUMMARY

In one aspect, the present invention relates to a coating composition useful in a variety of coating applications. The coating composition preferably includes at least a film-forming amount of a polyester polymer, preferably in the form of a copolyester resin having a backbone that includes one or more soft segments and one or more hard segments, and more preferably at least two hard segments. In preferred embodiments, the polyester polymer includes a plurality of hard segments and preferably has a glass transition temperature ("Tg") of from about 10° C. to about 50° C., more preferably from 10° C. to 35°. The one or more hard segments preferably have a Tg from about 10° C. to about 100° C.

In one embodiment, the polyester polymer has the following structure:

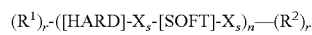

wherein:
[HARD] independently denotes a hard segment;
[SOFT] independently denotes a soft segment;
each X, if present, is independently a divalent organic group;
each s is independently 0 or 1;
n is at least 1 (more preferably at least 2);
$R^1$, if present, is a reactive functional group, an organic group, or a soft segment that may optionally include a terminal reactive functional group and may optionally be connected to a hard segment via a step-growth linkage;
$R^2$, if present, is a reactive functional group, an organic group, or a hard segment that may optionally include a terminal reactive functional group; and
each r is independently 0 or 1.

In one embodiment, the polyester polymer is a copolyester resin having a Tg from 10° C. to 50° C. and including alternating hard and soft segments. The copolyester resin is preferably a reaction product of ingredients including: (i) a polyester oligomer or polymer (preferably hydroxyl-terminated) having a Tg from 10° C. to 100° C. and (ii) an acid or polyacid (preferably a diacid) or equivalent (e.g., anhydride, ester and the like). Preferably, the hard segments are provided by ingredient (i) and the soft segments are provided by ingredient (ii).

Preferred coating compositions of the present invention are substantially free of mobile bisphenol A ("BPA") and/or aromatic glycidyl ether compounds, e.g., diglycidyl ethers of BPA ("BADGE"), diglycidyl ethers of bisphenol F ("BFDGE") and epoxy novalacs (e.g., NOGE), and more preferred compositions are also substantially free of bound BPA and/or aromatic glycidyl ether compounds.

The present invention also provides coated articles such as, for example, packaging articles (e.g., food and beverage containers or a portion thereof). Preferred packaging articles include "two-piece" cans formed at least in part using a metal substrate. These preferred cans typically comprise a body portion and an end portion, wherein at least one of the body and end portions are metal (e.g., aluminum or steel) and are coated on at least one major surface with a coating composition of the present invention.

The present invention also provides a method comprising: providing a coating composition of the present invention, which is preferably suitable for use as a food-contact packaging coating when suitably cured, and applying the coating composition to at least a portion of a planar metal substrate suitable for use in forming a food or beverage container or a portion thereof. In preferred embodiments, this method is accomplished utilizing a coil coating method. For example, a coil of a suitable substrate (e.g., aluminum or steel sheet metal) is first coated with the coating composition of the present invention on one or both sides, cured (e.g., using a bake process), and then the cured substrate is formed (e.g., by stamping or drawing) into a food or beverage container or a portion thereof such as, e.g., a beverage can end.

The present invention also provides a method comprising the steps of: providing a body and an end, wherein at least one of the end and the body is coated on at least one side with a coating composition of the present invention; filling the body with a product (e.g., a food or beverage product); and attaching the end to the body.

The details of one or more embodiments of the present invention are set forth in the description below. Other features, objects, and advantages of the present invention will be apparent from the description and from the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "aliphatic group" means a saturated or unsaturated linear or branched hydrocarbon group, which can include optional elements other than carbon and hydrogen. This term is used to encompass alkyl, alkenyl, and alkynyl groups, for example. The term "cyclic group" means a closed ring hydrocarbon group that is classified as a cycloaliphatic group or an aromatic group, both of which can include heteroatoms. The term cycloaliphatic group means an organic group that contains a ring that is not an aromatic group.

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that encompasses the moiety.

The term "substantially free" of a particular mobile compound means that the compositions of the present invention contain less than 100 parts per million (ppm) of the recited mobile compound. The term "essentially free" of a particular mobile compound means that the compositions of the present invention contain less than 10 ppm of the recited mobile compound. The term "essentially completely free" of a particular mobile compound means that the compositions of the present invention contain less than 1 ppm of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "crosslinker" refers to a molecule capable of forming a covalent linkage between polymers or between two different regions of the same polymer.

The term "water-dispersible" in the context of a water-dispersible polymer means that the polymer can be mixed into water (or an aqueous carrier) to form a stable mixture. For example, a mixture that separates into immiscible layers after being stored for 1 week at 120° F. (48.9° C.) is not a stable mixture. The term "water-dispersible" is intended to include the term "water-soluble." In other words, by definition, a water-soluble polymer is also considered to be a water-dispersible polymer.

The term "dispersion" in the context of a dispersible polymer refers to the mixture of a dispersible polymer and a carrier. The term "dispersion" is intended to include the term "solution."

Unless otherwise indicated, a reference to a "(meth) acrylate" compound (where "meth" is bracketed) is meant to include both acrylate and methacrylate compounds.

The term "polycarboxylic acid" includes both polycarboxylic acids and anhydride or esterified variants thereof.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., copolyester polymers).

The terms "unsaturated" or "unsaturation" when used in the context of a compound refers to a compound that includes at least one non-aromatic double bond, typically a carbon-carbon double bond.

The term "comprises" and variations thereof do not have a limiting meaning where these terms appear in the description and claims.

The terms "preferred" and "preferably" refer to embodiments of the present invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range intended to be a specific disclosure of all subranges included within the broader range (e.g., 1 to 5 discloses 1 to 4, 1.5 to 4.5, 1 to 2, etc.).

DETAILED DESCRIPTION

The present invention provides a polyester polymer that, in preferred embodiments, is a copolyester polymer having both one or more hard segments and one or more soft segments. The polyester polymer is particularly useful as a binder polymer in adherent coatings for use on packaging articles such as, for example, metal food or beverage containers. Thus, the present invention also provides a coating composition that preferably includes at least a film-forming amount of the polyester polymer of the present invention. Typically, the coating composition further includes one or more optional liquid carriers and one or more other optional ingredients such as a crosslinker, a catalyst, a pigment, etc.

Preferred compositions of the present invention are substantially free of mobile bisphenol A (BPA) and aromatic glycidyl ether compounds (e.g., diglycidyl ether of BPA (BADGE), the diglycidyl ether of bisphenol F (BFDGE), and epoxy novalacs), more preferably essentially free of mobile BPA and aromatic glycidyl ether compounds, even more preferably essentially completely free of mobile BPA and aromatic glycidyl ether compounds, and most preferably completely free of mobile BPA and aromatic glycidyl ether compounds. The coating composition is also more preferably substantially free of bound BPA and aromatic glycidyl ether compounds, more preferably essentially free of bound BPA and aromatic glycidyl ether compounds, even more preferably essentially completely free of bound BPA and aromatic glycidyl ether compounds, and most preferably completely free of bound BPA and aromatic glycidyl ether compounds.

The polyester polymers of the present invention are typically formed from reactants that include one or more polyacid molecules and one or more polyol molecules. In the various discussions of polyester reaction methods and reactants included herein, it should be understood that in synthesizing the polyester, the specified acids may be in the form of carboxylic acids, anhydrides, esters (e.g., alkyl ester) or like equivalent form. Some representative examples of polyacids and polyols useful in producing polyesters are provided below.

Suitable polyacids include adipic, azelaic, cyclohexane dicarboxylic, fumaric, isophthalic, maleic, phthalic, sebacic, succinic, terephthalic acids, anhydrides and ester variants thereof, and mixtures thereof.

Suitable polyol molecules include ethylene glycol, propylene glycol, butylene glycol, neopentyl glycol ("NPG", though NPG is not preferred in certain embodiments), cyclohexane diol, cyclohexane dimethanol, hexane diol, substituted propane diols (e.g., 2-methyl, 1,3-propane diol), substituted butane diols, substituted pentane diols, substituted hexane diols, methylol cycloalkanes (e.g., dimethylol cyclobutane, isosorbide, etc.), diethylene glycol and triols, and mixtures thereof.

The glass transition temperature ("Tg") of the polyester polymer can vary depending on a variety of factors including, for example, the performance requirements of the intended end use. In certain end uses, such as food or beverage can coatings, and beverage can ends in particular (e.g., beer or soda riveted can ends), the coating composition preferably exhibits both good flexibility (e.g., good fabrication for stamped or drawn articles) and good corrosion resistance (e.g., acceptable levels of retort resistance). In preferred such embodiments, the polyester polymer exhibits a Tg of at least about 10° C., more preferably at least about 15° C., and even more preferably at least about 20° C. Preferably, the polyester polymer exhibits a Tg of less than about 50° C., more preferably less than about 35° C., and even more preferably less than about 30° C. In one embodiment, the polyester polymer has a Tg from about 10° C. to about 35° C. A protocol useful for measuring the Tg of the polyester polymer via differential scanning calorimetry is provided in the Test Methods Section.

The polyester polymer of the present invention may be a linear polymer or a branched polymer. Polymers that are predominantly linear are presently preferred.

If desired, the polyester polymer of the present invention may include one or more step-growth linkages other than ester linkages. Examples of such linkages include amide, carbonate ester, ester, ether, urea, urethane, or combinations thereof. In one embodiment, the polyester polymer does not include any linkages (e.g., condensation linkages) other than ester linkages.

In preferred embodiments, a backbone of the polyester polymer includes both one or more hard segments and one or more soft segments. More preferably, the backbone includes a plurality of hard segments (i.e., ≥2, ≥3, ≥4, etc.) in combination with at least one soft segment (e.g., ≥1, ≥2, ≥3, etc.). While not intending to be bound by any theory, it is believed that the hard segments of the polyester polymer contribute to the excellent corrosion resistance of food-contact coatings formulated using the polyester polymer, including in food or beverage can retort processes at elevated temperature and pressure while contacting corrosive food or beverage product. The one or more soft segments are believed to impart elasticity to such coatings and facilitate fabrication.

In certain preferred embodiments, the coating composition of the present invention may be applied to flat planar metal substrate (e.g., aluminum or steel coil) prior to fabrication of the coated metal substrate (e.g., via stamping) into an article such as a riveted beverage can end. The coating composition of the present invention exhibits excellent fabrication (e.g., flexibility to accommodate stamping of a beverage end rivet and the extreme contours associated therewith) in such end uses, while still exhibiting excellent adhesion, corrosion resistance and retortability.

The hard and soft segments are preferably dispersed throughout the polyester backbone, preferably in a non-random distribution. In preferred embodiments, the polyester polymer has a backbone that includes an alternating sequence of hard and soft segments. In such embodiments, the alternating hard and soft segments are typically connected to one another via step-growth linkages, more typically condensation linkages such as ester linkages. A representative example of such an alternating polymer is provided below in Formula I:

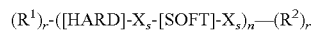

where:
- [HARD] independently denotes a hard segment of the present invention;
- [SOFT] independently denotes a soft segment of the present invention;
- each X, if present, is independently a divalent organic group, and more preferably a step-growth linkage such as, e.g., a condensation linkage;
- each s is independently 0 or 1, more preferably 1;
- n is 1 or more, more preferably to 1 to 15;
- $R^1$, if present, is a reactive functional group (e.g., —OH, —COOH, etc.), an organic group, or a soft segment that may optionally include a terminal reactive functional group;
- $R^2$, if present, is a reactive functional group (e.g., —OH, —COOH, etc.), an organic group or a hard segment that may optionally include a terminal reactive functional group and may optionally be connected to a hard segment via a divalent linkage (typically a step-growth linkage); and each r is independently 0 or 1.

In one embodiment, n is at least 2; each s is 1; each X is an ester linkage; each r is 1; $R^1$ is a reactive functional group, more preferably a hydroxyl group; and $R^2$ is a hard segment terminated with a reactive functional group, preferably $R^2$ is a hydroxyl-terminated hard segment.

In some embodiments, the polyester polymer of the present invention is terminated on each end with a hard segment, more preferably a hard segment having a terminal reactive functional group, and even more preferably a hydroxyl-terminated hard segment.

In preferred embodiments, the ratio, on a weight basis, of hard to soft segments in the polyester polymer is on average from 1:1 to 50:1, more preferably from 8:1 to 20:1, and even more preferably from 10:1 to 15:1 (hard segments:soft segments).

The polyester polymer may include any number of hard and soft segments. In preferred embodiments, the polyester polymer includes, on average, from 1 to 35, more preferably from 2 to 20, and even more preferably from 4 to 10 of each of the hard and soft segments. In preferred embodiments, the polyester polymer includes, on average, w soft segments (where "w" is the average number of soft segments) and w+1 hard segments (e.g., when w is 3, w+1 is 4).

The polyester polymer of the present invention may include one or more optional backbone segments (e.g., monomer, oligomer, or polymer segments) other than the hard or soft segments. Such optional segments may be monomer, oligomer, and/or polymer segments. In some embodiments, however, the hard and soft segments constitute substantially all, or even all, of the polyester polymer on a weight basis. In such embodiments, the hard and soft segments preferably constitute at least 75 weight percent ("wt-%"), at least 90 wt-%, at least 99 wt-%, or 100 wt-% of the polyester polymer of the present invention. The above weight percentages include any linkage groups (e.g., ester linkages) linking the hard and soft segments that are formed via reaction of complimentary reactive functionalities (e.g., hydroxyl and carboxylic groups) present on precursor hard and soft segment reactants.

The one or more hard segments of the polyester polymer are preferably an oligomer or polymer segment, and more preferably a polyester oligomer or polymer segment or a combination thereof. The hard segment preferably has a number average molecular weight (Mn) of at least 500. In preferred embodiments, the one or more hard segments exhibit a Tg of at least 10° C., more preferably at least 15° C., and even more preferably at least 20° C. Preferably, the one or more hard segments exhibits a Tg of less than about 100° C., more preferably less than 80° C., and even more preferably less than 70° C. In a particularly preferred embodiment, the hard segment has a Tg of from 20° C. to 40° C. By Tg of the hard segment is meant the Tg of the isolated component of the hard segment. A protocol useful for measuring the Tg of the hard segment via differential scanning calorimetry is provided in the Test Methods section.

The one or more hard segments preferably include a suitable amount of one or more of the following cyclic groups: aromatic groups (e.g., aryl groups, heteroaryl groups, or a combination thereof), saturated or unsaturated monocyclic alicyclic groups, saturated or unsaturated polycyclic groups (e.g., bicyclic groups or tricyclic or higher polycyclic groups) that may include any combination of aromatic and/or alicyclic groups, or a combination thereof. Examples of suitable compounds for incorporating cyclic groups into the hard segments include cyclohexane dicarboxylic acid, cyclohexane dimethanol, naphthalene dicarboxylic acid, diphenyl dicarboxylic acid, isoterephthalic acid, nadic anhydride, terephthalic acid, ortho-phthalic anhydride, isosorbide, tricyclodecanedimethanol, dimethylolcycloalkanes, combinations thereof, and variants (e.g., carboxylic, esterified, or anhydride variants) or derivatives thereof. Isoterephthalic acid and terephthalic acid are preferred cyclic-group-containing monomers for use in forming the one or more hard segments.

In some embodiments, the polymer includes at least one hard segment where cyclic groups, and more preferably aromatic groups, constitute at least 20 wt-%, more preferably at least 40 wt-%, even more preferably at least 45 wt-%, and optimally at least 50 wt-% of the hard segment. The upper concentration of cyclic groups in the hard segments is not particularly limited, but preferably the amount of such groups is configured such that the Tg of the hard segment does not exceed the Tg ranges previously discussed. The total amount of cyclic groups in the hard segment will typically constitute less than 100 wt-%, more preferably less than about 90 wt-%, and even more preferably less than 80 wt-% of the hard segment. The above weight percentages are expressed in terms of the total amount of cyclic-group-containing monomer present in the hard segment. In some embodiments, all or substantially all of the one or more hard segments present in the polyester polymer include an amount of cyclic groups falling within the above weight percentages.

In certain preferred embodiments, the hard segments are formed using one or more aromatic monomers, more preferably one or more aromatic polyacids or anhydrides, with aromatic diacids or anhydrides being especially preferred. Preferred aromatic diacids or anhydrides include ortho-phthalic anhydride, isophthalic acid, terephthalic acid, and mixtures or derivatives thereof.

In some embodiments, one or more polyols may also be included in the hard segments to influence the Tg such that it is suitably high to fall within a desired Tg range. Preferred such polyols include methyl propane diol (i.e., MPdiol), neopentyl glycol, tricyclodecane dimethanol, isorbide, and combinations or derivatives thereof. In a presently preferred embodiment, the hard segment is formed from ingredients including one or more such polyols in combination with one or more aromatic monomers (more preferably one or more aromatic diacids or anhydrides).

The hard segments may include substituents (either backbone or pendant) selected from, for example, oxygen atoms, nitrogen atoms, phosphorus atoms, sulfur atoms, silicon atoms, or groups containing any of the aforementioned atoms in combination with one or more atoms.

The hard segments may be of any suitable size. Preferably, the hard segments have an Mn of at least 500, more preferably at least 750, and even more preferably at least 1,000. Although the upper molecular weight of the hard segments is not particularly limited, in some embodiments, the hard segments exhibits an Mn of less than about 10,000, more preferably less than about 8,000, and even more preferably less than about 5,000.

In preferred embodiments, hard segments constitute at least 55 wt-%, more preferably at least 65 wt-%, and even more preferably at least 75 wt-% of the polyester polymer. In some embodiments, the hard segments constitute less than about 98 wt-%, more typically less than about 95 wt-%, and even more typically less than about 92 wt-% of the polyester polymer. The above weight percents refers to the non-volatile weight of the ingredients used to generate the one or more hard segments relative to the total non-volatile weight of the ingredients used to generate the polyester polymer.

The one or more soft segments can be of any suitable segment length and may be polymer segments, oligomer segments, monomer segments, or a combination thereof. When the one or more soft segments are polymer and/or or oligomer segments, polyester segments are preferred. The soft segments are preferably at least substantially aliphatic and more preferably are completely aliphatic (i.e., do not include any aromatic groups). While the soft segment may include one or more cyclic groups (e.g., so long as the desired properties of the polymer are preserved), in some embodiments, the soft segment is a linear chain segment that does not contain any aromatic groups, and more preferably does not contain any cyclic groups.

In preferred embodiments, the soft segment is an organic group that includes at least 4 carbon atoms and more preferably at least 6 carbon atoms. The soft segment may include substituents (either backbone or pendant) selected from, for example, oxygen atoms, nitrogen atoms, phosphorus atoms, sulfur atoms, silicon atoms, or groups containing any of the aforementioned atoms in combination with one or more atoms. In a presently preferred embodiment, the soft segment is an organic group, more preferably a divalent hydrocarbon group or moiety, which includes from 4 to 60 carbon atoms and more preferably from 6 to 36 carbon atoms. In such embodiments, the soft segment is typically derived from a reactant having (i) 4 to 60 carbon atoms and (ii) at least one, and more preferably two or more, reactive groups capable of participating in a step-growth reaction (more preferably a condensation reaction such as an ester-forming condensation reaction). Preferred reactive groups include carboxylic groups, anhydride groups, ester groups, and hydroxyl groups, with carboxylic groups being presently preferred.

In some embodiments, the soft segment is derived from a compound having the structure $R^3$—$(CR^4_2)_t$—$R^3$, wherein: each $R^3$ is independently a reactive group capable of participating in a step-growth reaction such as any of the preferred reactive groups discussed above; t is at least 2, more preferably 4 to 60, even more preferably 6 to 36, and optimally 8 to 36; and each $R^4$ is independently a hydrogen, a halogen, or an organic group. In one such embodiment, each $R^4$ is hydrogen and each $R^3$ is a carboxylic group or equivalent thereof.

In a preferred embodiment, the soft segment is derived from a carboxyl- or hydroxyl-terminated aliphatic reactant. In some embodiments, the chain linking the terminal hydroxyl or carboxyl end groups is a hydrocarbon chain that does not include any backbone heteroatoms.

In some embodiments, such as when the Mn of the soft segment is low, it may not be feasible to determine a Tg corresponding to the soft segment. However, since the measured Tg of a polymer tends to increase with molecular weight, when direct measurement of the Tg of the one or more soft segments is not feasible, information regarding the influence of the one or more soft segments on Tg may be gleaned by comparing the Tg of the one or more hard segments to the overall Tg of the polyester polymer. The material or materials used to generate the one or more soft segments are preferably selected such that the one or more soft segments contribute to (i) a lower overall Tg for the polyester polymer (e.g., as compared to a polyester polymer of a similar molecular weight lacking the one or more soft segments) and/or (ii) enhanced fabrication properties (e.g., flexibility) for a coating composition formulated using the polyester polymer. Examples of materials for use in forming the soft segment (either neat or in combination with one or more comonomers) include adipic acid; azelaic acid; fatty acid-based materials such as fatty acid dimers or dimer fatty diols (e.g., produced by hydrogenation of the corresponding diol); sebacic acid; succinic acid; glutaric acid; a derivative or variant thereof; or a mixture thereof. In some embodiments, a soft segment is derived from one of the above monomers without the use of an additional comonomer. When the soft segment is a polyester oligomer or polymer, the aforementioned monomers may be used in combination with one or more suitable comonomers to generate the soft segment.

The soft segment is typically attached on at least one end, and more preferably both ends, to another portion or portions of the polymer. While the soft segment may be attached to a segment of the polyester polymer other than a hard segment, typically the soft segment is attached on one or both ends to a hard segment or segments via a linkage group. Although not presently preferred, it is contemplated that the soft segment may be a backbone terminal group. Typically, the soft segment is attached on one or both ends to another portion or portions of the polymer via a step-growth linkage such as, for example, a condensation linkage. Examples of step-growth linkages include amide, carbonate ester, ester, ether, urea, or urethane linkage, with ester linkages being preferred. In a preferred embodiment, the polyester polymer of the present invention includes at least one backbone soft segment attached on each end via an ester linkage to a pair of hard segments.

The polyester polymer of the present invention may be formed using any suitable method. For example, the following methods may be employed in various embodiments:

A preformed hard segment is reacted with a preformed soft segment to form the polyester polymer.

The soft segment is formed in situ in the presence of a preformed hard segment.

The hard segment is formed in situ in the presence of a preformed soft segment.

A presently preferred method for forming the polyester polymer of the present invention is to react a hydroxy-terminated polyester oligomer or polymer comprising the hard segment with a polycarboxylic acid (preferably a dicarboxylic acid or equivalent) comprising the soft segment.

Preferred polyesters for use in solvent-based coating embodiments of the present invention have an acid number below about 10, more preferably below about 5 and most preferably about 4. The acid number (as used in reference to the present compositions) is the number of milligrams of potassium hydroxide required to neutralize one gram of the solid polyacid polymer. The acid number of an anhydride-containing polymer is determined by initially hydrolyzing the anhydride-containing polymer to obtain the corresponding polyacid polymer. The acid number is then determined in the same manner as for a polyacid polymer.

Preferred polyesters for use in the present invention have a hydroxyl number (OH number) below about 50, more preferably below about 40. Typically, the polyester polymer will have a hydroxyl number of at least 10, more preferably at least 20. The hydroxyl number of a hydroxyl-containing polymer of the present invention is determined by: (i) esterifying the polymer with acetic anhydride and pyridine to obtain an esterified polymer and acetic acid; and (ii) then neutralizing the acetic acid with potassium hydroxide. The units are expressed similarly to acid number, i.e., the number of milligrams of potassium hydroxide required to neutralize the acetic acid formed as described above per one gram of hydroxyl-containing polymer.

If water-dispersibility is desired, the polyester polymer of the present invention may contain a suitable amount of salt-containing and/or salt-forming groups to facilitate preparation of an aqueous dispersion or solution. Suitable salt-forming groups may include neutralizable groups such as acidic or basic groups. At least a portion of the salt-forming groups may be neutralized to form salt groups useful for dispersing the polyester polymer into an aqueous carrier. Acidic or basic salt-forming groups may be introduced into the polyester polymer by any suitable method.

Non-limiting examples of anionic salt groups include neutralized acid or anhydride groups, sulphate groups ($—OSO_3^-$), phosphate groups ($—OPO_3^-$), sulfonate groups ($—SO_2O^-$), phosphinate groups ($—POO^-$), phosphonate groups ($—PO_3^-$), and combinations thereof. Non-limiting examples of suitable cationic salt groups include:

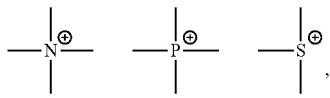

(referred to, respectively, as quaternary ammonium groups, quaternary phosphonium groups, and tertiary sulfate groups) and combinations thereof. Non-ionic water-dispersing groups (e.g., hydrophilic groups such as ethylene oxide groups) may also be used. Compounds for introducing the aforementioned groups into polymers are known in the art.

In some embodiments, a water-dispersible polyester polymer is achieved through inclusion of a sufficient number of carboxylic acid groups in the polymer. Examples of suitable materials for incorporating such groups into the polymer include polyanhydrides such as tetrahydrophthalic anhydride, pyromellitic anhydride, succinic anhydride, trimellitic anhydride ("TMA"), and mixtures thereof. The carboxylic-functional polyester oligomer or polymer is at least partially neutralized (e.g., using a base such as an amine) to produce an aqueous dispersion.

In some embodiments, it is contemplated that water-dispersibility may be provided through use of acid-functional ethylenically unsaturated monomers that have been grafted onto the polyester (e.g., via inclusion of an unsaturated monomer in the polyester such as maleic anhydride) to form a polyester-acrylic copolymer, whereby a suitable number of the acid-functional groups are neutralized with base (such as, e.g., a tertiary amine) to produce salt groups. See for example, U.S. Pat. App. No. 20050196629 for examples of such techniques.

In some embodiments, the polyester polymer (and preferably the coating composition) is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments.

In some embodiments, the polyester polymer of the present invention is "PVC-free," and preferably the coating composition is also "PVC-free." That is, each composition preferably contains less than 2 wt-% of vinyl chloride materials, more preferably less than 0.5 wt-% of vinyl chloride materials, and even more preferably less than 1 ppm of vinyl chloride materials.

Preferred coating compositions include at least about 60 wt-%, more preferably at least about 65 wt-%, and even more preferably at least about 70 wt-% of the polyester polymer of the present invention. Preferred coating compositions include up to about 100 wt-%, more preferably up to about 95 wt-%, and even more preferably up to about 80 wt-% of the polyester polymer of the present invention. These weight percentages are based on the total weight of resin solids present in the coating composition.

In accordance with the present invention, the coating composition further comprises a crosslinking resin in preferred embodiments. For example, any of the well known hydroxyl-reactive curing resins can be used. The choice of particular crosslinker typically depends on the particular product being formulated. Non-limiting examples of suitable crosslinkers include aminoplasts, phenoplasts, blocked isocyanates, and combinations thereof.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins include, for example, the condensation products of aldehydes such as formaldehyde, acetaldehyde, crotonaldehyde, and benzaldehyde with amino- or amido-group-containing substances such as urea, melamine, and benzoguanamine. Examples of suitable aminoplast resins include, without limitation, benzoguanamine-formaldehyde resins, melamine-formaldehyde resins, esterified melamine-formaldehyde, and urea-formaldehyde resins.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandiamide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Non-limiting examples of suitable isocyanate crosslinkers include blocked or non-blocked aliphatic, cycloaliphatic or aromatic di-, tri-, or poly-valent isocyanates, such as hexamethylene diisocyanate (HMDI), cyclohexyl-1,4-diisocyanate and the like, and mixtures thereof. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

The level of curing agent required will depend on the type of curing agent, the time and temperature of the bake, and the molecular weight of the polymer. When used, the crosslinker is typically present in an amount ranging from between about 5 to 40% by weight. Preferably, the crosslinker is present in an amount ranging from between 10 to 30% by weight; and more preferably, from between 15 to 25% by weight. These weight percentages are based upon the total weight of the resin solids in the coating composition.

If desired, the coating composition may optionally include one or more vinyl polymers. An example of a preferred vinyl polymer is an acrylic copolymer, with acrylic copolymers having pendant glycidyl groups being particularly preferred. Suitable such acrylic copolymers are described in U.S. Pat. No. 6,235,102, which is herein incorporated by reference. When present, the optional acrylic copolymer is typically present in an amount ranging from 2 to 20% by weight. Preferably, the acrylic copolymer is present in an amount ranging from between 2 to 15% by weight; more preferably, from between 2 to 10% by weight; and optimally, from between 5 to 10% by weight. These weight percentages are based upon the total weight of the resin solids in the coating composition.

Suitable acrylic copolymers having pendant glycidyl groups that are useful in the present invention preferably contain about 30 to 80 wt-%, more preferably about 40 to 70 wt-%, and most preferably about 50 to 70 wt-% of a monomer containing a glycidyl group, for example, glycidyl methacrylate.

Suitable monomers containing a glycidyl group include any monomer having an aliphatic carbon-carbon double bond and a glycidyl group. Typically, the monomer is a glycidyl ester of an alpha, beta-unsaturated acid, or anhydride thereof. Suitable alpha, beta-unsaturated acids include monocarboxylic acids or dicarboxylic acids. Examples of such carboxylic acids include, but are not limited to, acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof. Specific examples of monomers containing a glycidyl group are glycidyl(meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the monomer.

It also should be pointed out that the acrylic copolymer can initially be a copolymer of an alpha, beta-unsaturated acid and an alkyl(meth)acrylate, which then is reacted with a glycidyl halide or tosylate, e.g., glycidyl chloride, to position pendant glycidyl groups on the acrylate copolymer. The alpha, beta-unsaturated carboxylic acid can be an acid listed above, for example.

In an alternative embodiment, an acrylic copolymer having pendant hydroxyl groups first is formed. The acrylic copolymer having pendant hydroxyl groups can be prepared by incorporating a monomer like 2-hydroxyethyl methacrylate or 3-hydroxypropyl methacrylate into the acrylate copolymer. The copolymer then is reacted to position pendant glycidyl groups on the acrylic copolymer.

A preferred monomer containing a glycidyl group is glycidyl(meth)acrylate.

The acrylic copolymer may optionally be formed from reactants including an alkyl(meth)acrylate having the structure: $CH_2=C(R^5)—CO—OR^6$ wherein $R^5$ is hydrogen or methyl, and $R^6$ is an alkyl group containing 1 to 16 carbon atoms. The $R^6$ group can be substituted with one or more, and typically one to three, moieties such as hydroxy, halo, amino, phenyl, and alkoxy, for example. Suitable alkyl (meth)acrylates for use in the copolymer therefore encompass hydroxy alkyl(meth)acrylates and aminoalkyl(meth) acrylates. The alkyl(meth)acrylate typically is an ester of acrylic or methacrylic acid. Preferably, $R^5$ is methyl and $R^6$ is an alkyl group having 2 to 8 carbon atoms. Most preferably, $R^5$ is methyl and $R^6$ is an alkyl group having 2 to 4 carbon atoms. Examples of the alkyl(meth)acrylate include, but are not limited to, methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, and nonyl(meth) acrylates.

The acrylic copolymer preferably comprises one or more vinyl comonomers such as styrene, halostyrene, isoprene, diallylphthalate, divinylbenzene, conjugated butadiene, alpha-methylstyrene, vinyl toluene, vinyl naphthalene, and mixtures thereof. Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like.

The aforementioned monomers may be polymerized by standard free radical polymerization techniques, e.g., using initiators such as peroxides or peroxy esters, to provide an acrylic copolymer preferably having an Mn of about 2,000 to 15,000, more preferably about 2,500 to 10,000, and most preferably about 3,000 to 8,000. The acrylic may be produced in situ in presence of the polyester polymer and/or may be least partially grafted to the polyester (e.g., if the polyester contains unsaturation such as may be introduced using maleic anhydride).

The coating composition of the present invention may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom.

One optional ingredient is a catalyst to increase the rate of cure and/or the extent of crosslinking Non-limiting examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, tin and zinc compounds, and combinations thereof. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant, like a wax, which facilitates manufacture of coated articles (e.g., food or beverage can ends) by imparting lubricity to planar coated metal substrate. A lubricant is preferably present in the coating composition in an amount of 0 to about 2%, and preferably about 0.1 to about 2%, by weight of nonvolatile material. Preferred lubricants include, for example, Carnauba wax and polyethylene type lubricants.

Another useful optional ingredient is a pigment, like titanium dioxide. A pigment, like titanium dioxide, is optionally present in the coating composition in an amount of 0 to about 50%.

In preferred embodiments, the coating composition is a liquid composition, where the resins, crosslinker and other optional ingredients are dispersed in a liquid carrier. Any suitable carrier may be used to prepare the coating composition. Suitable carriers include organic solvents, water, and mixtures thereof. Preferably, the carrier(s) are selected to provide a dispersion or solution of the polyester polymer of the present invention for further formulation. In certain preferred embodiments, the carrier is a nonaqueous carrier. The carrier preferably has sufficient volatility to evaporate essentially entirely from the coating composition during the curing process, such as during heating at about 220 to 260° C. for about 10 to 30 seconds.

Suitable nonaqueous carriers are known in the art of coating compositions, and include, for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones, and methyl isoamyl ketone; aromatic hydrocarbons, like aromatic 100, butyl cellosolve, toluene, benzene, and xylene; aliphatic hydrocarbons, like mineral spirits, kerosene, and naphtha; alcohols, like isopropyl alcohol, n-butyl alcohol, and ethyl alcohol; aprotic solvents, like tetrahydrofuran; chlorinated solvents; esters (e.g., dibasic ester); glycol ether esters, like propylene glycol monomethyl ether acetate; and mixtures thereof. It should be understood that solvent-based embodiments of the coating composition can include water (though this is not preferred), preferably at most a relatively low amount of water, such as up to about 5% by total weight of the composition. The water can be added to the composition intentionally, or can be present in the composition inadvertently, such as when water is present in a particular component included in the coating composition.

The amount of optional liquid carrier included in the composition is limited only by the desired, or necessary, rheological properties of the composition. Usually, a sufficient amount of carrier is included in the coating composition to provide a composition that can be processed easily and that can be applied to a metal substrate easily and uniformly, and that is sufficiently removed from the coating composition during curing within the desired cure time. Preferred coating compositions have between 10 to 50 wt-% solids, more preferably between 20 to 40 wt-% solids.

In some water-based coating embodiments, the coating composition preferably includes at least about 10 wt-%, more preferably at least about 20 wt-%, and even more preferably at least about 25 wt-% of water, based on the total weight of the coating composition. In some such embodiments, the coating composition preferably includes less than about 90 wt-%, less than about 60 wt-%, less than about 50 wt-%, or less than about 40 wt-% of water, based on the total weight of the coating composition.

In some embodiments, the cured coating composition of the present invention preferably has a Tg of at least 20° C., more preferably at least 25° C., and even more preferably at least 30° C. Preferably, the Tg of the coating composition is less than about 80° C., more preferably less than about 70° C., and even more preferably less than about 60° C.

Cured coatings of the present invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The coating composition of the present invention can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The coating composition can be applied on a substrate prior to, or after, forming the substrate into an article. In some embodiments, at least a portion of a planar substrate is coated with one or more layers of the coating composition of the present invention, which is then cured before the substrate is formed into an article (e.g., via stamping, drawing, draw-redraw, etc.).

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the present invention is a heat-curable coating composition.

The coating composition of the present invention may be applied, for example, as a mono-coat direct to metal (or direct to pretreated metal), as a primer coat, as an intermediate coat, as a topcoat, or any combination thereof.

Coating compositions of the present invention may be useful in a variety of coating applications. The coating compositions are particularly useful as adherent coatings on interior or exterior surfaces of metal packaging containers. Non-limiting examples of such articles include closures (including, e.g., internal surfaces of twist-off caps for food and beverage containers); internal crowns; two and three-piece metal cans (including, e.g., food and beverage cans); shallow drawn cans; deep drawn cans (including, e.g., multi-stage draw and redraw food cans); can ends (including, e.g., riveted beverage can ends and easy open can ends); monobloc aerosol containers; and general industrial containers, cans, and can ends.

The aforementioned coating composition is particularly well adapted for use as a coating for two-piece cans, including two-piece cans having a riveted can end. Two-piece cans are manufactured by joining a can body (typically a drawn metal body) with a can end (typically a drawn metal end). The coatings of the present invention are suitable for use in food-contact situations and may be used on the inside of such cans. The coatings are also suited for use on the exterior of the cans. Notably, the present coatings are well adapted for use in a coil coating operation. In this operation a coil of a suitable substrate (e.g., aluminum or steel sheet metal) is first coated with the coating composition of the present invention (on one or both sides), cured (e.g., using a bake process), and then the cured substrate is formed (e.g., by stamping or drawing) into the can end or can body or both. The can end and can body are then sealed together with a food or beverage contained therein.

In a preferred embodiment, the coating composition of the present invention is particularly well adapted for use as an internal or external coating on a riveted beverage can end (e.g., a beer or soda can end). Preferred embodiments of the coating composition exhibit an excellent balance of corrosion resistance and fabrication properties (including on the harsh contours of the interior surface of the rivet to which the pull tab attaches) when applied to metal coil that is subsequently fabricated into a beverage can end.

Some non-limiting embodiments are provided below to further illustrate the present invention.

A. A coating composition, comprising:
a copolyester resin preferably having a glass transition temperature from 10° C. to 50° C. and the following structure:

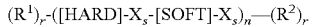

wherein:
[HARD] independently denotes a hard segment preferably having a Tg of from 10 to 100° C.,
[SOFT] independently denotes a soft segment,
each X, if present, is independently a divalent organic group,
s is 1,
n is 2 or more,
$R^1$, if present, is a reactive functional group, an organic group, or a soft segment that optionally includes a terminal reactive functional group or a divalent linkage group attaching the soft segment to a hard segment,
$R^2$, if present, is a reactive functional group, an organic group, or a hard segment that optionally includes a terminal reactive functional group, and
each r is independently 0 or 1; and
a crosslinker;
wherein the coating composition is suitable for use as a food-contact packaging coating when suitably cured; and B. A coating composition that includes:
a copolyester resin preferably having a Tg from 10° C. to 50° C. and including alternating hard and soft segments, wherein the copolyester resin is a reaction product of ingredients including:
  (i) a polyester oligomer or polymer preferably having a Tg from 10° C. to 100° C., and
  (ii) an acid or diacid compound or equivalent (e.g., a mono-carboxylic-functional compound, a di-carboxylic-functional compound, an ester or anhydride equivalent thereof, or a mixture thereof),
wherein the soft segments are provided by the acid or diacid equivalent; and
a crosslinker.

C. An article, comprising:
a food or beverage container, or a portion thereof, having a metal substrate; and
a coating composition applied on at least a portion of the metal substrate,
wherein the coating composition includes:
a copolyester resin having a glass transition temperature from 10° C. to 50° C. and the following structure:

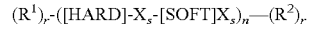

wherein:
[HARD] independently denotes a hard segment,
[SOFT] independently denotes a soft segment,
each X, if present, is independently a divalent organic group,
each s is independently 0 or 1,
n is at least 2,
$R^1$, if present, is a reactive functional group, an organic group, or a soft segment that optionally includes a terminal reactive functional group or a divalent linkage group attaching the soft segment to a hard segment,
$R^2$, if present, is a reactive functional group, an organic group, or a hard segment that optionally includes a terminal reactive functional group, and
each r is independently 0 or 1; and
a crosslinker.

D. A method, comprising:
providing a coating composition that is suitable for use as a food-contact packaging coating when suitably cured, the coating composition comprising:
a copolyester resin preferably having a Tg from 10° C. to 50° C. and the following structure:

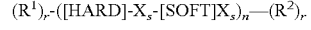

wherein:
[HARD] independently denotes a hard segment,
[SOFT] independently denotes a soft segment,
each X, if present, is independently a divalent organic group,
each s is independently 0 or 1,
n is at least 1,
$R^1$, if present, is a reactive functional group, an organic group, or a soft segment that optionally includes a terminal reactive functional group or a divalent linkage group attaching the soft segment to a hard segment, R², if present, is a reactive functional group, an organic group, or a hard segment that optionally includes a terminal reactive functional group,
each r is independently 0 or 1, and
the copolyester resin includes two or more hard segments; and
a crosslinker; and
applying the coating composition to at least a portion of a planar metal substrate suitable for use in forming a food or beverage container or a portion thereof.

E. A food or beverage container or a portion thereof formed from the method of Embodiment D or having a coating composition of Embodiments A or B applied on at least a portion of a major surface of a metal substrate.

F. Any of Embodiment A-E, wherein the hard segments are oligomer segments, polymer segments, or a combination thereof.

G. Any of Embodiments A-F, wherein the copolyester resin has a Tg from 15 to 35° C. (prior to curing).

H. Any of Embodiments A-G, wherein the hard segments are derived from a polyester oligomer or polymer having a number average molecular weight of at least about 500.

I. Any of Embodiments A-H, wherein the hard segments have a Tg of from 10° C. to 100° C.

J. Any of Embodiments A-I, wherein the soft segment comprises a substituted or unsubstituted hydrocarbon segment having at least four backbone carbon atoms.

K. Any of Embodiments A-J, wherein the soft segment comprises a linear or branched hydrocarbon moiety that includes 6 to 36 carbon atoms.

L. Any of Embodiments A-K, wherein the soft segment is derived from a compound having the structure $R^3$—$(CR^4_2)_t$—$R^3$, wherein: each $R^3$ is independently a reactive functional group capable of participating in a step-growth reaction (more preferably a carboxylic group); t is at least 2, more preferably 4 to 60, even more preferably 6 to 36, and optimally 8 to 36; and each $R^4$ is independently a hydrogen, a halogen, or an organic group.

M. Any of Embodiments A-L, wherein the soft segment is derived from adipic acid, azelaic acid, a fatty-acid-based diacid, sebacic acid, succinic acid, glutaric acid, or a derivative or mixture thereof.

N. Any of Embodiments A and C-M, wherein s is 1 and X includes an ester linkage.

O. Any of Embodiments A and C-N, wherein r is 1 and $R^1$ and $R^2$ are each a reactive functional group.

P. Any of Embodiments A-O, wherein the copolyester resin is a reaction product of reactants including: a hydroxyl-functional polyester oligomer or polymer, and a diacid or diacid equivalent, wherein the weight ratio of polyester oligomer or polymer to diacid or diacid equivalent is from 8:1 to 20:1.

Q. Any of Embodiments A-P, wherein the coating composition includes, based on total resin solids, at least 60 wt-% of the copolyester resin.

R. Any of Embodiments A-Q, wherein the coating composition further comprises from 2 to 20 wt-% of an acrylate copolymer that may optionally include one or more glycidyl groups.

S. Any of Embodiments A-R, wherein the copolyester resin has one or both of an acid number less than 10 or a hydroxyl number of from 10 to 50.

T. Any of Embodiments A-S, wherein the copolyester resin constitutes greater than 90 wt-% of the total amount of polyester present in the coating composition, based on total polyester solids.

U. Any of Embodiments A-T, wherein the coating composition is substantially free of bound bisphenol A, and preferably substantially free of both bound bisphenol A and aromatic glycidyl ether compounds.

V. Any of Embodiments C-U, wherein the article includes a riveted beverage can end having the coating composition applied on at least a portion of the can end.

W. Any of Embodiments A-V, wherein the coating composition, when present on a riveted beverage can end at a dry film thickness of msi, passes less than 1 mA of current after being exposed for 4 seconds to a room-temperature electrolyte solution containing 1% by weight of NaCl dissolved in water.

TEST METHODS

Unless indicated otherwise, the following test methods were utilized in the Examples that follow.

Differential Scanning Calorimetry

Samples for differential scanning calorimetry ("DSC") testing were prepared by first applying the liquid resin composition or coating composition onto aluminum sheet panels. For resin samples (e.g., polyester oligomer or polymers used to form the hard segments or the final polyester polymer itself), the panels were then heated in a Fisher Isotemp electric oven for 20 minutes at 300° F. (149° C.) to remove volatile materials. For coating composition samples, the panels were baked for 12 seconds (total oven time) to a peak metal temperature of 250° C. After cooling to room temperature, samples of film were scraped from the panels, weighed into standard sample pans and analyzed using the standard DSC heat-cool-heat method. (If coating removal from the aluminum panels is overly difficult, glass panels may also be used.) The samples were equilibrated at −60° C., then heated at 1° C. per minute to 200° C., cooled to −60° C., and then heated again at 1° C. per minute to 200° C. Glass transitions points were calculated from the thermogram of the last heat cycle. The glass transition was measured at the inflection point of the transition.

Water Retort and Pasteurization

These tests are a measure of the coating integrity of the coated substrate after exposure to heat (and pressure in the case of water retort) with a liquid such as water. Retort performance is not necessarily required for all food and beverage coatings, but is desirable for some product types that are packed under retort conditions. This test provides an indication of an ability of a coating to withstand conditions frequently associated with food or beverage preservation or sterilization. For the present evaluation, coated substrate samples (in the form of flat panels) were placed in a vessel and partially immersed in water.

The water retort method was as follows: While partially immersed in the water, the coated substrate samples were placed in an autoclave and subjected to heat of 121° C. and pressure of 1 atm above atmospheric pressure for a time period of 90 minutes. Just after retort, the coated substrate samples were tested for adhesion and blush resistance.

The water pasteurization method was as follows: Coated substrate samples (1.5 inches by 8 inches) were partially immersed in 82° C. distilled water for 30 minutes. Just after water pasteurization, the coated substrate samples were tested for adhesion and blush resistance.

Dowfax Detergent Test

The "Dowfax" test is designed to measure the resistance of a coating to a boiling detergent solution. The solution is prepared by mixing 1.96 grams of DOWFAX chips (product of Dow Chemical) into one liter of deionized water. Typically, coated substrate strips are immersed into the boiling Dowfax solution for 15 minutes. The strips are then rinsed and cooled in deionized water, dried, and then tested and rated for blush resistance and adhesion.

Solvent Resistance Test

The extent of "cure" or crosslinking of a coating is measured as a resistance to solvents, such as methyl ethyl ketone (MEK) or isopropyl alcohol (IPA). This test is performed as described in ASTM D5402-93, with the exception that the cheesecloth was affixed to a 32-ounce ball-peen hammer in order to apply constant pressure. The number of double-rubs (i.e., one back-and-forth motion) before coating failure is reported, with rubbing ceased at 100 double-rubs if no coating failure is observed. Preferably, the MEK solvent resistance is at least 30 double rubs.

Adhesion Test

Adhesion testing was performed to assess whether the coating compositions adhere to the underlying substrate. The Adhesion Test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

Blush Resistance Test

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush, a rating of "8" indicates slight whitening of the film, and a rating of "5" indicates whitening of the film, and so on. Blush ratings of 7 or more are typically desired for commercial packaging coatings and optimally 9 or above.

Wedge Bend Test

This test provides an indication of a level of flexibility of a coating and an extent of cure. For the present evaluation, test wedges were formed from coated rectangular metal test sheets (which measured 12 cm long by 10 cm wide). Test wedges were formed from the coated sheets by folding (i.e., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges was measured.

The results of this test for coatings prepared according to the present invention are expressed as a wedge bend percentage using the following calculation:

100%×[(120 mm)−(mm of failure)]/(120 mm).

A coating is considered herein to satisfy the Wedge Bend Test if it exhibits a wedge bend percentage of 70% or more.

Fabrication Test

This test measures the ability of a coated substrate to retain its integrity as it undergoes the formation process necessary to produce a fabricated article such as a riveted beverage can end. It is a measure of the presence or absence of cracks or fractures in the formed end. The end is typically placed on a cup filled with an electrolyte solution. The cup is inverted to expose the surface of the end to the electrolyte solution. The intensity of the current that passes through the end is then measured. If the coating remains intact (no cracks or fractures) after fabrication, minimal current will pass through the end.

For the present evaluation, fully converted 202 standard opening beverage ends were exposed for a period of 4 seconds to a room-temperature electrolyte solution comprised of 1% NaCl by weight in deionized water. The coating to be evaluated was present on the interior surface of the beverage end at a dry film thickness of 6 to 7.5 milligrams per square inch ("msi") (or 9.3 to 11.6 grams per square meter), with 7 msi being the target thickness. Metal exposure was measured using a WACO Enamel Rater II (available from the Wilkens-Anderson Company, Chicago, Ill.) with an output voltage of 6.3 volts. The measured electrical current intensity, in milliamps, is reported. End continuities are typically tested initially and then after the ends are subjected to pasteurization, Dowfax, or retort.

Preferred coatings of the present invention initially pass less than 10 milliamps (mA) when tested as described above, more preferably less than 5 mA, most preferably less than 2 mA, and optimally less than 1 mA. After pasteurization, Dowfax detergent test, or retort, preferred coatings give continuities of less than 20 mA, more preferably less than 10 mA, even more preferably less than 5 mA, and even more preferably less than 1 mA.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

Polyester Polymers Having Hard and Soft Segments

The ingredients, and weights parts of each ingredient, used to produce the polyester copolymers of Example 1, Runs 1 and 2 are listed below in Table 1.

TABLE 1

| | Component | Run 1 (amount in grams) | Run 2 (amount in grams) |
|---|---|---|---|
| 1 | Mono ethylene glycol | 12 | 12 |
| 2 | Neopentylglycol | 101.9 | 101.9 |
| 3 | Trimethylol propane | 13 | 13 |
| 4 | Propylene glycol | 30.7 | 30.7 |
| 5 | Terephthalic acid | 89.9 | 89.9 |
| 6 | Isophthalic acid | 156.9 | 156.9 |
| 7 | Tin catalyst | 0.7 | — |

TABLE 1-continued

| Component | Run 1 (amount in grams) | Run 2 (amount in grams) |
|---|---|---|
| 8 Tin-free catalyst | — | 0.8 |
| 9 Dimer fatty acid | 54.1 | 54.1 |
| 10 SOLVESSO 100 solvent | 36.2 | 36.2 |
| 11 Methoxy propyl acetate | 292.3 | 292.3 |

The polyester polymers of Runs 1 and 2 were produced as described below using the same method.

A polyester polymer intermediate (corresponding to the hard segment) was first produced from components 1-7 as follows. For each polyester, components 1 to 4 in Table 1 were added to a round-bottom flask equipped with a stirrer, a partial-packed condenser topped with a decanter and a total condenser, a thermometer, and a nitrogen feed. The temperature was increased to around 70° C. and maintained until the middle became fluid. Components 5 and 6 were then added slowly and the middle of the partial condenser was heated to 110° C. before adding the catalyst (component 7). The middle of the partial condenser was then progressively heated to 245° C., while the temperature at the top of the partial condenser was maintained between 98° C. and 102° C. The temperature of the middle of the partial condenser was maintained at 245° C. to 250° C. until the cut viscosity at 55% non-volatile content ("NVC") in ESTA-SOL solvent (a mixture of dimethyle glutarate, adipate and succinate available from Dow) reached 21-23 Poises (Noury method) and the acid number was less than 12. The water produced during the process (around 55 g) was removed from the equipment.

After cooling the polyester intermediate product and replacing the partial condenser by a decanter topped with a total condenser, components 9 and 10 were added at 180° C. The mixture was maintained for 30 minutes at a temperature of 175° C. The temperature was then slowly increased to maintain a gentle and continuous reflux. The reaction water was removed from the equipment via the decanter while the solvent was returned to the reaction vessel.

The mixture was cooled when the cut viscosity at 20° C. and 55% NVC in a Dowanol PM (methoxy propanol)/Dowanol DPM (monoethyl ether of dipropylene glycol) solvent mixture (3:1 mixture) reached 21-23 Poises (Noury method) and the acid number was less than 8. The temperature of the product was about 215° C. and the mass of collected reaction water was about 57 grams. At 160° C., component 11 was added to produce a polyester solution having the following characteristics: NVC (30 minutes at 180° C. for a 1 gram sample) was about 55%, the acid number (on dry resin) was less than 8, and the viscosity at 20° C. was 33-37 Poises (Koury method).

Example 2

Polyester Polymer Having Hard and Soft Segments

The polyester polymers of Example 2, Runs 3 and 4, were produced using the ingredients in the indicated weight parts listed below in Table 2. The process conditions and final composition parameters were similar to that of Example 1.

TABLE 2

| Components | Run 3 (amount in grams) | Run 4 (amount in grams) |
|---|---|---|
| 1 Methyl propane diol | 243.37 | 243.37 |
| 2 Monoethylene glycol | 39.4 | 39.4 |
| 3 Cyclohexane dimethanol (90% in water) | 59 | 59 |
| 4 Trimethylol propane | 7.9 | 7.9 |
| 5 Isophthalic acid | 129.8 | 129.8 |
| 6 Terephthalic acid | 380.4 | 380.4 |
| 7 Tin catalyst | 1 | 0 |
| 8 Tin-free catalyst | 0 | 0.96 |
| 9 Sebacic acid | 129.8 | 129.8 |
| 10 SOLVESSO 100 solvent | 67.9 | 67.9 |
| 11 SOLVESSO 100 solvent | 159 | 159 |
| 12 Xylene | 415 | 415 |

As described in the methodology of Example 1, a hydroxyl-terminated polyester polymer incorporating components 1-6 was first formed. The reaction was continued until the intermediate polyester polymer product was clear and the cut viscosity at 70% NVC in methoxypropyl acetate solvent reached 40-45 Poises and the acid number was less than 7. The hydroxyl-terminated polyester polymer intermediate was then reacted with sebacic acid (component 9) to form a polyester polymer having both hard and soft segments. The reaction was continued until the acid number was less than 20. At 200° C., component 10 was added and the reflux was maintained until cut viscosity at 50% NVC in xylene solvent reached 30-35 Poises at 25° C. A polyester solution was obtained after addition of components 11 and 12 having the following characteristics: a viscosity at 25° C. of 140-160 Poises, an acid number (on solids) of less than 7, and a NVC (1 gram sample, 30 minutes at 150° C.) of 56-58%.

The polyester polymer of Example 2, Run 4 was determined to have a Tg of 23° C.

Example 3

Coating Composition

The coating composition of Example 3 was prepared from the ingredients using the indicated weight parts listed in Table 3. The components below were added one-by-one and mixed together until a homogenous coating solution was obtained. The resulting coating composition, when cured, had a Tg of 31° C.

TABLE 3

| Example 1, Run 2 Polyester | 42.3 |
|---|---|
| DOWANOL PMA methoxypropyl acetate (Dow) | 3.5 |
| Xylene | 8.8 |
| Butylglycol | 5.4 |
| Amino crosslinker resin | 7 |
| Acrylic resin* | 3.9 |
| Resole phenolic crosslinker resin | 0.7 |
| 83X822 catalys** | 0.3 |
| Lubricant wax dispersion | 1.9 |
| SOLVESSO 100 aromatic hydrocarbon solvent (Exxon) | 13 |
| DOWANOL PMA solvent | 13 |
| | 100 |

*The acrylic resin was an oxirane-functional acrylic resin formed from ingredients including glycidyl methacrylate and had an Mn of 2,500 to 3,000 and a weight average molecular weight of 10,000 to 12,000.
**The 83X822 catalyst is a 10% solution of dodecylbenzenesulfonic acid in butanol, available from Cytec.

Example 4

Coated Article

The coating composition of Example 3 was applied using a hand bar coater on aluminum panel (0.22 mm thickness and having a conventional chrome pre-treatment) to obtain a dry film weight of about 10 grams per square meter. The coated panel was cured for 12 seconds (total oven time) in a suitably heated oven so that a peak metal temperature of 240° C. was achieved. The cured coating was then subjected to a variety of coating evaluations to assess the coating properties of the cured film with respect to use as a beverage end coating. These test results are summarized in the below Table 4.

TABLE 4

| Evaluation | Blush w/v * | Adhesion w/v * |
|---|---|---|
| Water Pasteurization | 10/10 | 10/10 |
| Dowfax Detergent Test | 8/10 | 10/10 |
| Water Retort | 10/10 | 10/10 |
| Feathering (in millimeters) after 45 minutes in 85° C. Water | | 0.1 |
| MEK double rubs | | 100 |

* "w" denotes data from portions of the coating exposed to the liquid phase and "v" denotes data from portions of the coating exposed to the vapor phase.

The data reported in the above Table 4 is consistent with that of a coating composition suitable for use as an internal coating on a riveted beverage can end.

In addition, a cured coating composition identical to that of Example 3, except for that it included a different wax package, was evaluated using the Fabrication Test (after having been cured using cure conditions similar to that of Example 4). The cured beverage can end coating passed, on average, 0.11 mA of current.

Example 5

Coating Composition

A coating composition was prepared using the ingredients in the indicated amounts in the below Table 5. The components were added one-by-one under agitation and mixed until the solution became homogeneous.

TABLE 5

| Ingredient | Amount (weight parts) |
|---|---|
| Example 2, Run 2 Polyester | 92 |
| Blocked isocyanate | 17 |
| Glycol-ether-type solvent | 24 |
| Additives (wax, wetting agent, etc.) | 2 |

The viscosity of the resulting varnish was about 80 seconds (Number 4 Ford cup at 20° C.) and the NVC (30 minutes at 180° C.) was about 40%.

Example 6

Coated Article

The varnish of Example 5 was applied as an overcoat varnish on a sheet-fed-type panel of tin plate (0.20 millimeter thickness, 2.8 gram tin weight per square meter, 314 chrome treated) precoated with a white base coating (modified-polyester type coating). The dry film weight of the overcoat varnish was about 6 grams per square meter and the film was cured for 10 minutes (total oven time) in a 200° C. oven.

The resulting coated panel was then subjected to a variety of tests to assess the coating properties of the cured multi-coat coating system. The coating properties are reported in the below Table 6.

TABLE 6

| Adhesion on ETP | 10 |
| Wedge Bend | 100% |
| MEK resistance | >25 double rubs |

The coating properties data reported in the above Table 6 is consistent with that of a coating composition suitable for use as a sheet-fed food can coating. In addition, the coating composition exhibited excellent scratch resistance/hardness (according to the Sheen test), which is an important property for can production. The flexibility and the retort resistance in water were excellent and the coating composition exhibited very low thermal plasticity of the coating composition (as indicated by blocking resistance).

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An article, comprising:
   a riveted beverage can end; and
   a coating applied on at least a portion of the riveted beverage can end, the coating formed from a coating composition comprising:
   a cyclic-group-containing copolyester resin formed from reactants that include one or more polyacid molecules and one or more polyol molecules, wherein the reactants include trimethylol propane and an aliphatic reactant comprising a compound having the structure $R^3$—$(CR^4_2)_t$—$R^3$, wherein:
   each $R^3$ is independently a reactive group capable of participating in a step-growth reaction;
   t is 4 to 60; and
   each $R^4$ is independently a hydrogen, a halogen, or an organic group;
   wherein the coating composition includes, based on total resin solids, at least about 60 weight percent of the copolyester resin; and
   wherein the copolyester resin has an acid number less than about 10.

2. The article of claim 1, wherein $R^3$ is independently a carboxylic group, an anhydride group, an ester group, or a hydroxyl group.

3. The article of claim 1, wherein each $R^3$ is a carboxylic group.

4. The article of claim 1, wherein each $R^3$ is a carboxylic group, wherein t is 6 to 36, and wherein each $R^4$ is hydrogen.

5. The article of claim 1, wherein the copolyester resin has a glass transition temperature from 10° C. to 50° C.

6. The article of claim 1, wherein each $R^4$ is hydrogen, and wherein the copolyester resin has a glass transition temperature from at least about 20° C. to less than about 35° C.

7. The article of claim 1, wherein the aliphatic reactant comprises adipic acid or a derivative thereof.

8. The article of claim 1, wherein the aliphatic reactant comprises sebacic acid.

9. The article of claim 1, wherein the copolyester resin has a glass transition temperature from at least 15° C. to less than 40° C.

10. The article of claim 1, wherein the cured coating has a glass transition temperature from at least 25° C. to less than 60° C.

11. The article of claim 1, wherein the copolyester resin constitutes greater than 90 weight percent of the total amount of polyester present in the coating composition, based on total polyester solids.

12. The article of claim 1, wherein the copolyester resin has a hydroxyl number of from 10 to 40.

13. The article of claim 1, wherein the coating composition is substantially free of bound bisphenol A and aromatic glycidyl ether compounds.

14. The article of claim 1, wherein the coating composition includes an aminoplast crosslinker.

15. The article of claim 14, wherein the coating composition further include a resole phenolic crosslinker.

16. The article of claim 14, wherein the aminoplast crosslinker comprises a benzoguanamine-formaldehyde resin.

17. The article of claim 14, wherein the aminoplast crosslinker comprises a reaction product of an aldehyde with benzoguanamine.

18. The article of claim 1, wherein the coating composition is a solvent-based coating composition, wherein the copolyester resin has a glass transition temperature from 10° C. to 50° C.

19. The article of claim 18, wherein the reactants used to form the copolyester resin include a polyester oligomer or polymer that is itself formed from reactants including one or more of isophthalic acid and terephthalic acid.

20. The article of claim 19, wherein the aliphatic reactant comprises adipic acid, azelaic acid, a fatty-acid-based diacid, sebacic acid, succinic acid, glutaric acid, or a derivative or mixture thereof.

21. The article of claim 1, wherein the coating composition is substantially free of bound bisphenol A.

22. The article of claim 21, wherein the reactants include isophthalic acid.

23. The article of claim 21, wherein the reactants include naphthalene dicarboxylic acid or a derivative thereof.

24. The article of claim 23, wherein:
the coating compositions includes a benzoguanamine-formaldehyde crosslinker,
the coating composition includes a lubricant in an amount of about 0.1 to about 2% by weight of nonvolatile material, and
the copolyester resin has a hydroxyl number below 40.

25. The article of claim 24, wherein the coating composition include between 20 to 30 weight percent solids.

26. The article of claim 24, wherein the lubricant comprises a Carnauba wax.

27. The article of claim 21, wherein the coating composition includes a Carnauba wax.

28. The article of claim 21, wherein after being exposed for 4 seconds to a room-temperature electrolyte solution containing 1% by weight of NaCl dissolved in water the coating passes less than 2 mA of current.

29. The article of claim 21, wherein after immersion in 82° C. distilled water for 30 minutes the coating passes less than 10 mA of current.

30. The article of claim 21, wherein after boiling in Dowfax detergent solution (1.96 grams of DOWFAX chips dissolved in one liter of deionized water) for 15 minutes the coating exhibits an adhesion rating of at least 8.

31. The article of claim 21, wherein after boiling in Dowfax detergent solution (1.96 grams of DOWFAX chips dissolved in one liter of deionized water) for 15 minutes the coating exhibits an adhesion rating of 10.

32. The article of claim 21, wherein after immersion in 82° C. distilled water for 30 minutes the coating exhibits an adhesion rating of at least 8.

33. The article of claim 21, wherein after immersion in 82° C. distilled water for 30 minutes the coating exhibits an adhesion rating of 10.

34. The article of claim 21, wherein the article comprises a beverage can that includes the riveted beverage can end, and wherein the beverage can contains a beverage product.

35. The article of claim 1, wherein the reactants used to form the copolyester resin include 2-methyl, 1,3-propane diol.

36. The article of claim 35, wherein the reactants include isophthalic acid.

37. The article of claim 1, wherein the aliphatic reactant comprises a dimer fatty acid.

38. The article of claim 1, wherein the aliphatic reactant includes one of adipic acid, sebacic acid, a dimer fatty acid, derivatives thereof, or combinations thereof, wherein the copolyester resin has a glass transition temperature from at least 15° C. to less than 40° C., and wherein the coating composition is free of neopentyl glycol.

39. The article of claim 1, wherein the aliphatic reactant includes one of adipic acid, sebacic acid, a dimer fatty acid, derivatives thereof, or combinations thereof, wherein the copolyester resin has a glass transition temperature from at least 15° C. to less than 40° C., and wherein the coating composition includes, based on total resin solids, greater than 70 weight percent of the copolyester resin.

40. The article of any of claims 1, wherein the cured coating has at least 100 methyl ethyl ketone (MEK) double rubs per ASTM D5402-93 using a cheesecloth affixed to a 32-ounce ball-peen hammer.

41. The article of any of claims 40, wherein the reactants include one or more of isophthalic acid and terephthalic acid.

* * * * *